(12) United States Patent
Kim et al.

(10) Patent No.: US 7,356,530 B2
(45) Date of Patent: Apr. 8, 2008

(54) SYSTEMS AND METHODS OF RETRIEVING RELEVANT INFORMATION

(75) Inventors: Brian S. Kim, San Jose, CA (US);
Sudong Chung, San Jose, CA (US);
Anurag Dod, Santa Clara, CA (US)

(73) Assignee: Looksmart, Ltd., San Francisco, CA (US)

( * ) Notice: Subject to any disclaimer, the term of this patent is extended or adjusted under 35 U.S.C. 154(b) by 95 days.

(21) Appl. No.: 09/757,435

(22) Filed: Jan. 10, 2001

(65) Prior Publication Data
US 2002/0129014 A1 Sep. 12, 2002

(51) Int. Cl.
*G06F 17/30* (2006.01)
*G06F 17/00* (2006.01)

(52) U.S. Cl. .............. 707/7; 707/5; 707/10; 715/501.1; 715/513

(58) Field of Classification Search .............. 707/1–10; 715/501.1, 513
See application file for complete search history.

(56) References Cited

U.S. PATENT DOCUMENTS

| | | | |
|---|---|---|---|
| 5,835,905 A * | 11/1998 | Pirolli et al. ................... | 707/3 |
| 5,855,015 A * | 12/1998 | Shoham ......................... | 707/5 |
| 5,895,470 A * | 4/1999 | Pirolli et al. ................. | 707/102 |
| 5,920,859 A * | 7/1999 | Li ................................. | 707/5 |
| 5,933,822 A * | 8/1999 | Braden-Harder et al. ....... | 707/5 |
| 6,112,203 A * | 8/2000 | Bharat et al. ................... | 707/5 |
| 6,237,011 B1 * | 5/2001 | Ferguson et al. ........... | 715/515 |
| 6,278,992 B1 * | 8/2001 | Curtis et al. ................... | 707/3 |
| 6,282,511 B1 * | 8/2001 | Mayer ........................ | 704/270 |
| 6,285,999 B1 * | 9/2001 | Page ............................. | 707/5 |
| 6,317,741 B1 * | 11/2001 | Burrows ........................ | 707/5 |
| 6,334,131 B2 * | 12/2001 | Chakrabarti et al. .......... | 707/10 |
| 6,356,899 B1 * | 3/2002 | Chakrabarti et al. ........... | 707/5 |
| 6,418,433 B1 * | 7/2002 | Chakrabarti et al. ........... | 707/5 |
| 6,546,388 B1 * | 4/2003 | Edlund et al. ................. | 707/5 |
| 6,560,600 B1 * | 5/2003 | Broder ......................... | 707/7 |
| 6,571,240 B1 * | 5/2003 | Ho et al. ....................... | 707/5 |
| 6,618,723 B1 * | 9/2003 | Smith ............................ | 707/5 |
| 6,640,218 B1 * | 10/2003 | Golding et al. ................ | 707/2 |
| 6,728,752 B1 * | 4/2004 | Chen et al. ................. | 709/203 |
| 6,738,678 B1 | 5/2004 | Bharat et al. | |
| 6,799,176 B1 * | 9/2004 | Page ............................. | 707/5 |
| H2111 H * | 11/2004 | Hurlburt et al. ............ | 709/217 |

(Continued)

*Primary Examiner*—John Breene
*Assistant Examiner*—Anh Ly
(74) *Attorney, Agent, or Firm*—Irell & Manella LLP

(57) ABSTRACT

The present invention provides systems and methods of retrieving the pages according to the quality of the individual pages. The rank of a page for a keyword is a combination of intrinsic and extrinsic ranks. Intrinsic rank is the measure of the relevancy of a page to a given keyword as claimed by the author of the page while extrinsic rank is a measure of the relevancy of a page on a given keyword as indicated by other pages. The former is obtained from the analysis of the keyword matching in various parts of the page while the latter is obtained from the context-sensitive connectivity analysis of the links connecting the entire Web. The present invention also provides the methods to solve the self-consistent equation satisfied by the page weights iteratively in a very efficient way. The ranking mechanism for multi-word query is also described. Finally, the present invention provides a method to obtain the more relevant page weights by dividing the entire hypertext pages into distinct number of groups.

13 Claims, 6 Drawing Sheets

U.S. PATENT DOCUMENTS

| | | |
|---|---|---|
| 6,862,586 B1 * | 3/2005 | Kreulen et al. ................. 707/3 |
| 6,871,202 B2 * | 3/2005 | Broder ........................... 707/7 |
| 7,058,628 B1 * | 6/2006 | Page ............................. 707/5 |
| 7,181,438 B1 * | 2/2007 | Szabo ............................ 707/2 |
| 2002/0038299 A1 * | 3/2002 | Zernik et al. ................... 707/3 |
| 2003/0074368 A1 * | 4/2003 | Schuetze et al. ......... 707/103 R |
| 2003/0208482 A1 * | 11/2003 | Kim et al. ....................... 707/3 |
| 2004/0030688 A1 * | 2/2004 | Aridor et al. ................... 707/3 |
| 2004/0044962 A1 * | 3/2004 | Green et al. ................. 715/513 |
| 2005/0240557 A1 * | 10/2005 | Rorex et al. .................... 707/1 |
| 2006/0235842 A1 * | 10/2006 | Szekely et al. ................. 707/5 |

* cited by examiner

RECORD FILE WITH VARIOUS SIZE RECORDS

RECORD FILE WITH FIXED SIZE RECORDS

EMPTY SPACE

SYSTEMS AND METHODS OF RETRIEVING RELEVANT INFORMATION

The present invention relates to systems and methods for retrieving relevant information from a large collection of information such as that on the Internet and in particular the World Wide Web.

BACKGROUND

The World Wide Web (Web) is a rapidly growing part of the Internet. One group estimates it grows roughly seven million Web pages (pages) each day adding to an already enormous body of information. One study estimates there are more than two billion publicly available pages representing a growing fraction of the world's information. However, because of the Web's rapid growth and lack of central organization, millions of people cannot find specific information in an efficient manner.

To understand the problem, one must understand how the Internet and the Web are organized. The Internet is a communications infrastructure, which links computers throughout the world. It provides certain basic rules, termed protocols, by which computers can send data to each other. When a computer is ready to send the data, it uses software to break data into packets that conform to the Internet Protocol (IP) and the Transmission Control Protocol (TCP). IP governs how packets of information are sent over the Internet. TCP allows one computer to send a stream of data to another by breaking the data into packets, reassembling the packets at the receiving computer, and resending any missing packets. To do this they label each packet with a unique number and send it over the network. The receiving computer uses its Internet software to put the data in order. The data can be nearly anything: text, email, images, sounds, and software.

The Web is the innovation of Tim Berners-Lee. See Berners-Lee, *Weaving the Web* (1999). His fundamental innovation was to provide a universal accessible hypertext medium for sharing information on the Internet. He understood that to become valuable the Web required many publishers. Because information constantly changes, it requires that any authorized person must be able to publish, correct, and read that information without any central control. Thus, there is no central computer governing the Web, and no single network or organization that runs it. To publish information, a person only needs access to a Web server, a computer program that shares Web resources with other computers. The person operating the Web server defines who contributes, modifies and accesses the information. In turn, to access that information, a person only needs a client computer system, and a computer program, such as a browser, which can access the server to read, edit, and at times correct the information displayed.

To be universally accessible, the Web is as unconstrained as possible. To allow computers to talk to each other everywhere, there are only a few basic rules: all resources on the Web, termed Web pages or pages, are identified by an address, termed a URL (Uniform Resource Locator). Once a page has a URL, it can be published on a Web server and found by a browser. For example, one URL is http://www.amazon.com/. The letters to the left of the double slashes tell the browser what protocol to use, here HTTP, to look up the page. The part to the right—www.amazon.com identifies the Web server where the page exists. HTTP, a computer language, specifies which computer talks first and how to talk in turn. HTTP supports hypertext, nonsequential text, which links the pages together. Hidden behind a hypertext word, phrase, symbol, or image is the destination page's URL, which tells the browser where to locate the page. The loosely linked sets of pages constitute an information web. Once the computers agree to this conversation, they need a common language so they can understand each other. If they use the same software, they can proceed, otherwise they can translate to HTML (Hypertext Markup Language), a computer language supporting hypertext, and the language most persons currently use to write pages. It should be understood, however, that other languages such as XML, SMGL, as well as Java and JavaScript could be used to write pages.

In short, the Web is all information accessible to computers, where a URL identifies each unit of information. The Web has no central index to the pages, such as that contained in a public library. Instead, the pages have addresses and are loosely organized by links to each other. Thus, the Web provides little structure to support retrieval of specific information. Instead, the Web creates a hypertext space in which any computer can link to any other computer.

Practically any computer can display pages through a browser such as Microsoft Internet Explorer or Netscape Communicator once connected to the Internet. Upon request the browser will fetch the page, interpret the text and display the page on the screen. The page may contain hypertext links, which are typically represented by text or an icon that is highlighted, underlined, and/or shown in a different color. The text or icon is referred to as anchor text. To follow the link, the user will move the cursor over the anchor text and click the mouse.

Several techniques exist for retrieving specific information. If the URL of the page is known, browsing the page suffices. If the Web site is known, one can go to the Web site map, search the site, or follow the links. This often works when the information is known to exist within a Web site. However, if the URL and site are unknown, finding information requires other techniques. Two known techniques are Web directories and search engines. For example, Yahoo! classifies information in a hierarchy of subjects, such as Computer & Internet and Education. One chooses a category, then successive subcategories that seem likely to lead one to the information sought. But the categories are not mutually exclusive so multiple paths appear in the hierarchy. Once a category is selected, the previous category disappears forcing one to retrace one's steps to consider the other paths not taken. The further the search goes into the hierarchy, the more difficult it is to remember what other paths could be explored. To assist in searching the categories, Yahoo! provides phrase searching, and logical operators such as AND, OR, and NOT to specify which keywords must be present or absent in the pages, truncation of keywords, name searching, and field searching, e.g., in the title or URL.

By late-1999, Yahoo! reported indexing more than 1.2 million pages, but this is relatively small compared to the Web. In late 1999, Yahoo! had about 100 editors compiling and categorizing Web sites, but even if this number greatly increases, Yahoo! is not expected to cover the entire Web.

Web search engines are an important means of information retrieval of the pages. Search engines such as Google, FAST, AltaVista, Excite, HotBot, Infoseek, and Northern Light have fuller coverage of the Web. In *Searching the World Wide Web*, Science 280, 98-100 (1998), Lawrence and Giles reported that the major search engines covered less than half of the 320 million pages. More recently, Google and FAST reported indexing over a billion pages. However, as search engines increase their coverage, they exacerbate an existing problem.

Search engines pull up all pages meeting the search criteria, which can overwhelm the searcher with thousands of irrelevant pages. Once they arrive, the searcher must review them one page at a time to find the relevant ones. Even if they could download many pages, average searchers are not always willing to take a look at more than a display of pages. Therefore it is important to present the most relevant pages to the searchers at the top of the list, say in first twenty results.

Because thousands of pages may outwardly match the search criteria, the major search engines have a ranking function that will rank higher those pages having certain keywords in certain locations such as the title, or the Meta tag, or at the beginning of a page. This does not, however, typically put the most relevant page at the top of the list; much less assess the importance of the page relative to other pages. Moreover, relying solely on the content of the page itself—including the Meta tags which do not appear when displayed—to rank the page can be a major problem to the search engine. A web author can repeat "hot" keywords many times, termed spamming, for example, in the title or Meta tags to raise the rank of a given page without adding value.

Unlike standard paper documents, the Web includes hypertext, which links one page to another and provides significant information through the link structure. For example, the inbound links to a page help to assess the importance of the page. Because some of the inbound links originate from authors other than the one who wrote the page being considered, they tend to give a more objective measure of the quality or importance of the pages. By making a link to other page, the author of the originating page endorses the destination page. Thus, to make your page highly regarded in this kind of ranking system, you need to convince a lot of other people to put links to your page in their pages.

Simple counting of inbound links, however, will not tell us the whole story. If a page has only one inbound link, but that link comes from a highly weighted page such as the Yahoo! home page, the page might be reasonably ranked higher than a page that has several inbound links coming from less visited pages.

SUMMARY OF THE INVENTION

The present invention relates to systems and methods of information retrieval. In one embodiment, a search engine and a method produces relevant search results to keyword queries. The search engine includes a crawler to gather the pages, indexer(s) to extract and index the URLs of pages with keywords into indexed data structure(s), and ranks hypertext pages based on intrinsic and extrinsic ranks of the pages based on content and connectivity analysis. The page weights can be calculated based on an iterative numerical procedure including a method for accelerating the convergence of the scores. The search engine can also rank pages based on scores of a multi-keyword query. The ranking scores can be based on using the entire set of hypertext pages and/or a subset based on topic or the like.

One embodiment of the present invention provides a general-purpose search engine a method to rank the pages without limitation to topic according to the quality of individual pages. This embodiment of the present invention enables the search engine to present the search results in such a way that the most relevant results appear on the top of the list.

DETAILED DESCRIPTION OF THE EMBODIMENTS

The present invention relates to retrieving relevant pages from hypertext page collections. For conciseness, we describe a search engine for collecting, storing, indexing, and ranking Web pages in response to searcher queries. However, one of ordinary skill will understand after review of the specification that the search engine can be used on many other collections of hypertext pages.

Figure 1:
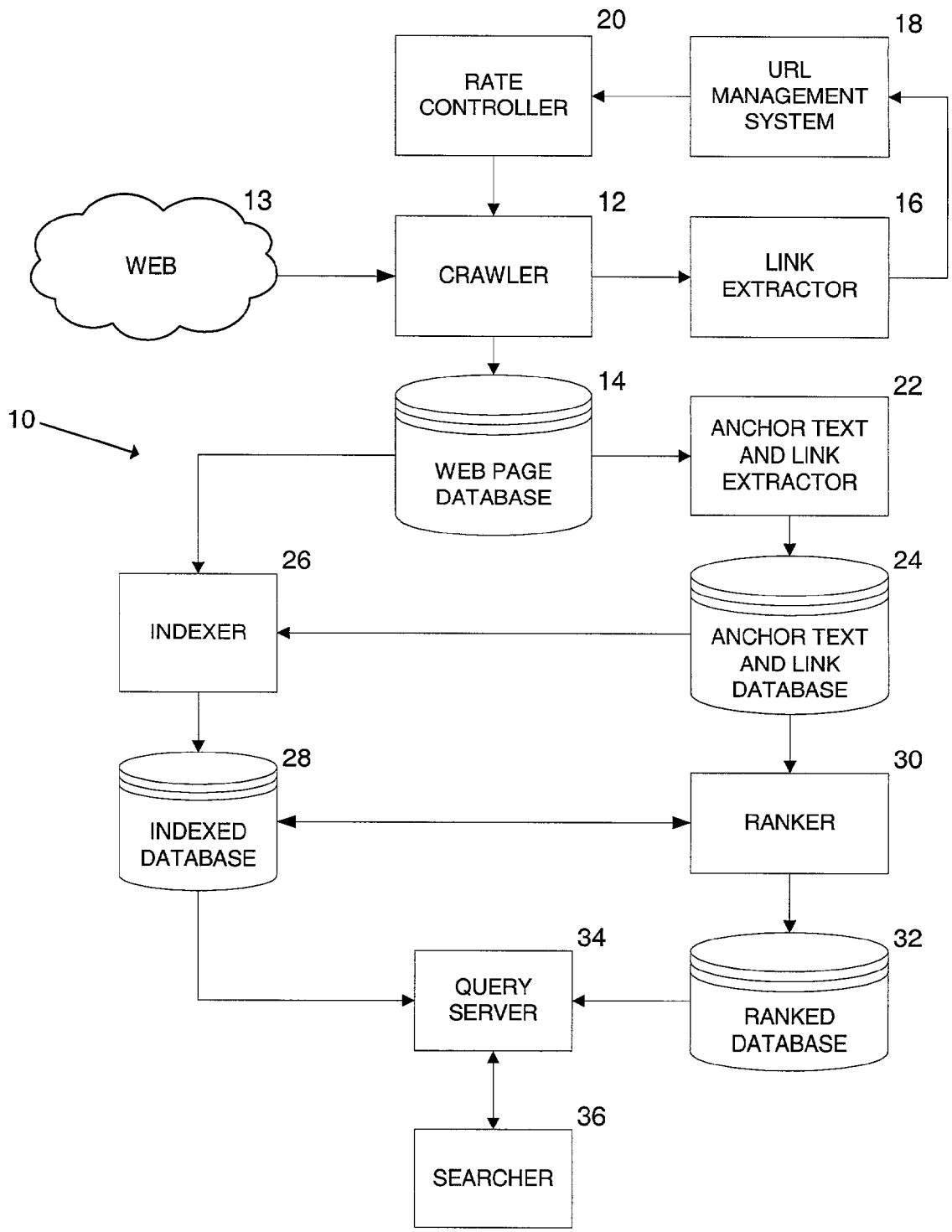
FIG. 1 illustrates an embodiment of the architecture of the search engine.

FIG. 1 illustrates one embodiment of a search engine 10, which includes a crawler 12 to fetch pages from the Web 13. In one embodiment, the search engine 10 is written in C++, runs on the Microsoft 2000 Server operating system, preferably in parallel using suitable Intel Pentium processors. It should be clear, however, that it is not essential to the invention that this hardware and operating system be used, and other hardware and operating systems can be used such as Solaris or Linux. Preferably, we run multiple instances of the crawler 12 to increase its capacity to crawl and re-crawl enormous hypertext document collections such as pages on the Web. The crawler 12 stores the fetched pages in a Web page database 14, which includes data structures optimized for fast access of the fetched pages as explained below in connection with FIGS. 2A-2C.

The crawler 12 also sends the fetched pages to a link extractor 16, which finds the outbound links in the pages and sends the source and destination URLs of the links to a URL management system (UMS) 18. The UMS 18 assigns an identification number to each URL and maintains a database of identification number and URL pairs preferably in a hash table. The UMS 18 checks the URLs one by one, and if a new URL is found, it is sent to the crawler 12 to be written in the Web page database 14 preferably through a rate controller 20. The rate controller 20 buffers the URLs to be crawled, and sends the URLs to the crawler 12 only when the Web site providing the new page has not received a crawling request for a certain amount of time. This ensures a Web site does not get excessive crawling requests.

The search engine 10 provides an indexing function in the following manner. The anchor text and link extractor 22 writes the source URL identification number, the destination URL identification number, and associated anchor text to the anchor text and link database 24. Anchor text is a section of text, an icon, or other element in a page that links to another page. The indexer 26 extracts the anchor text from the anchor text and link database 24 and parses the keywords from the Web page database 14 and generates an indexed database 28. The indexer 26 stores each keyword and its associated list of URL identification numbers for fast retrieval.

The search engine 10 ranks the pages in the following manner. The ranker 30 reads the link structure from the anchor text and link database 24, calculates the page weight, reads the indexed words from the indexed database 28, and calculates the rank value for each keyword and page pair. The ranker 30 stores the page weight and the rank values in the indexed database 28. The ranker 30 also builds a ranked database 32 as a subset of the indexed database 28 for a single keyword query.

One purpose of the search engine is to respond to a search query with the search results in order of relevancy. The ranker 30 measures the relevancy of each page by examining its content, its page weight, the weight of the links to the page, and the weight of the linking pages. The words, the font size, and the position of the words define the content of the page. For example, the ranker 30 compares the font size of each word relative to other words in the page to determine how important is the word. The position of the word in the page also may matter. For example, if the word is in the title, it may be desirable to give it more weight than if the word appears at the bottom of the page. Page weight is the probability of visitors viewing the page. The ranker 30 determines the intrinsic rank of the page by multiplying the content score by the page weight.

The ranker 30 measures the weight of the links to the page by examining the text associated with the link such as the anchor text. For example, the ranker 30 gives more credit to a link from a page with the keyword in its anchor text. The ranker 30 determines the extrinsic rank of the page by multiplying the link weight by the page weight.

When a query server 34 receives a query from a searcher 36, it collects the relevant pages from the ranked database 32 and indexed database 28. Given the huge size of these databases, the pages are stored across multiple instances of search nodes. Each search node in the query server 34 collects a fixed number of the most relevant results from the databases it manages and returns them to query server 34. The query server 34 then sorts and ranks the results from these different nodes and presents the most relevant results, typically ten, at a time.

Figure 2A:
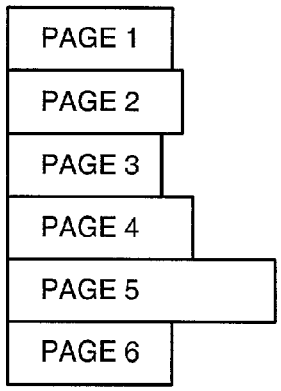
FIGS. 2A-2C illustrate embodiments of the Web page database.
Figure 2B:
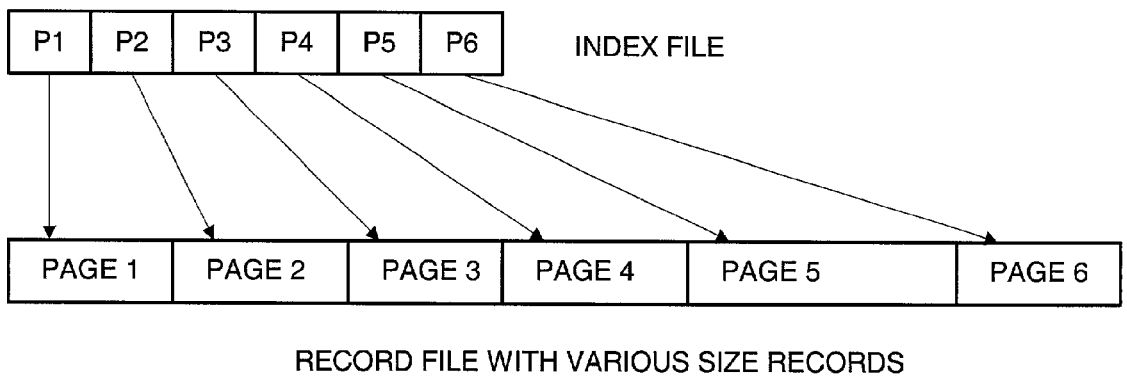
Figure 2C:
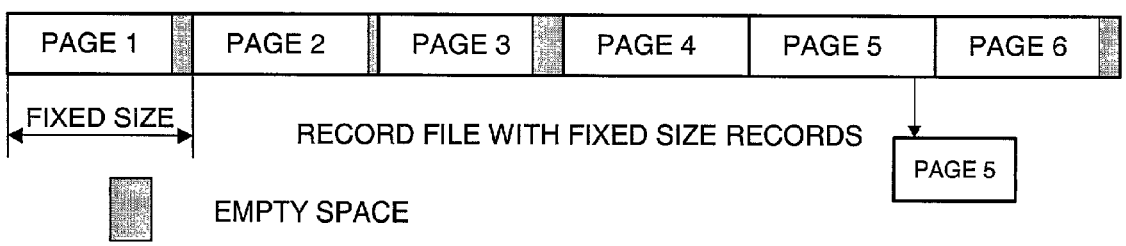

FIGS. 2A-2C illustrate that the data structures of the Web page database 14 typically need to accommodate different size pages. As shown in FIG. 2A, pages 1-4 and 6 show that most compressed pages are roughly the same size, that is, not exceeding, for example, 6K bytes, while page 5 represents that some are larger. In FIG. 2B, the data structure stores pages adjacent to each other in a record file to save storage space, and provides an index file containing the starting address of each page. This requires the Web page database 14 engage in two steps for retrieving a page. In FIG. 2C, the preferred data structure leverages the fact that many of the compressed pages are below a threshold, e.g., 6K bytes, and stores those pages in a fixed record large enough to contain 85% of the pages. If the page is smaller, the fixed record has some amount of empty space. If the page is larger, the Web page database 14 stores as much of the page as possible in the fixed record and the rest in a record file. Thus, the Web page database 14 requires just one step to retrieve 85% of the pages, greatly reducing access time. One of ordinary skill would understand that it is neither essential to set the threshold at 85% of the pages, nor set the size of the fixed record to 6K bytes. To conserve storage space, a known compression technique such as the Microsoft Foundational Class (MFC) zlib library can compress the pages by 4 to 1 or 3 to 1.

Figure 3:
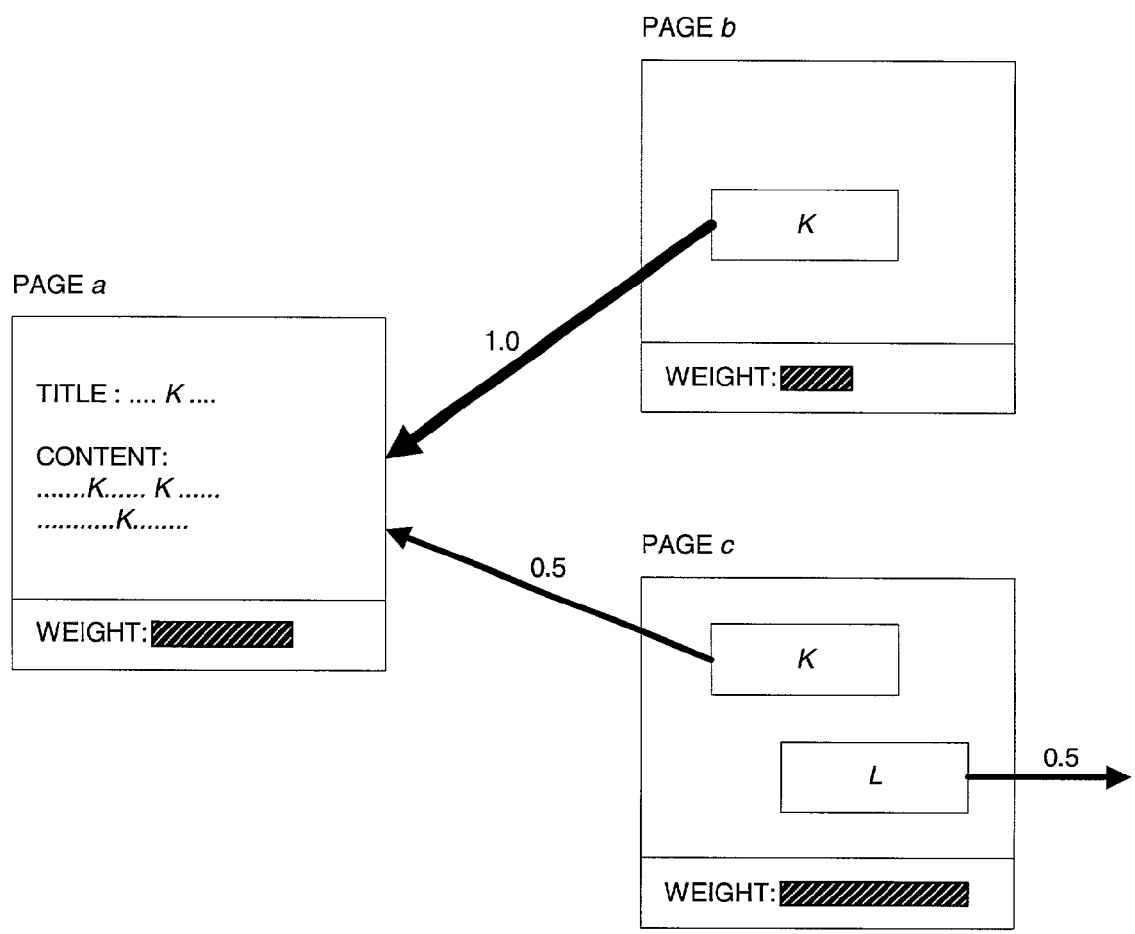
FIG. 3 illustrates the extrinsic rank and the intrinsic rank of a Web page.

FIG. 3 illustrates how the ranker 30 determines the relevancy of a page by a combination of the intrinsic rank and extrinsic rank. Suppose we want to rank the relevancy of page a to a search query with keyword K.

We calculate intrinsic rank by looking at the content of page a. The author of page a can repeat the keyword K many times to claim page a is relevant to keyword K, but this relatively high content score can be adjusted by the weight of page a, that is, the importance of page a as indicated by other pages. Thus, the intrinsic rank of page a for keyword K is defined as the content score of page a multiplied by the page weight of the page a.

We calculate the extrinsic rank of page a by looking at the inbound links shown here as originating from page b and page c. Page b is shown as having one outbound link so its link weight is 1.0, while page c has two outbound links, which reduces each link weight to 0.5. The anchor weight for keyword K is obtained for each of these links. In one embodiment, anchor weight is equal to link weight if the keyword K is found in the anchor text and zero if otherwise. In another embodiment, anchor weight can have smaller value than link weight if the keyword K is not found in the anchor text but related to or in the vicinity of the anchor text. The extrinsic rank is defined as the sum of the anchor weight multiplied by the page weight of all the pages shown here as page b and page c with inbound links to page a.

The overall rank of page a can be then calculated by combining the intrinsic rank and extrinsic rank in the following formula:

$$WR(K;a)=IR(K;a)+e \cdot ER(K;a)$$

Where the variables are defined as follows:

WR(K;a): Rank of page a for keyword K.

IR(K;a): Intrinsic rank of page a for keyword K.

ER(K;a): Extrinsic rank of page a for keyword K.

The adjustable parameter e determines the relative importance of the extrinsic rank with respect to the intrinsic rank. For instance, e=5 can be used but the value is not essential to the present invention.

Intrinsic Rank

Intrinsic rank is the measure of the importance of a page for a given keyword as claimed by the author of the page. Importance can be measured by examining the content of the page, e.g., the appearance of the keyword in the title or headings or body of the text, but this may be misleading. Some websites exaggerate the importance of their pages by repeating "hot" keywords endlessly without adding any value to the content of the page. We respect the author's claim as much as the page is worth. If the page is highly respected and frequently cited, we value author's claims more, and if otherwise, less. One solution is to use the page weight:

$$IR(K;a)=C(K;a) \cdot PW(a)$$

Here C(K;a) represents the content score of page a for keyword K and PW(a) represents the page weight for page a.

Content Score

The content score can be calculated in many ways. One embodiment is as follows:

$$C(K;a)=t \cdot T(K;a)+p \cdot P(K;a)+u \cdot U(K;a)$$

Where the variables are defined as follows:

T(K;a)=1 if keyword K is found in the title of the page a and 0 otherwise.

P(K;a) represents the frequency of the keyword K in the plain text of page a. In one embodiment, P(K;a) is a constant, which prevents spamming. By plain text we mean text in the page excluding the title.

P(K;a)=1 if keyword K is found in URL and 0 otherwise.

Parameters t, p and u represent the relative importance of the title, the plain text, and the URL field.

Page Weight

Page weight of a page is defined as the probability for a user—who travels on the Web endlessly in a random but well-defined manner—to visit the page. If a page has high probability to be visited by the user, the page is more likely to be a well-known page and to have many links from other pages.

In one embodiment, we can calculate the page weight by adding a hypothetical page, termed a page weight reservoir to the collection of pages. The page weight reservoir has a bi-directional link to each page in the collection. The page weight reservoir acts as a sink for pages having no outbound links (terminal pages) and a source for pages having no inbound links. The page weight reservoir also solves the problem of pages pointing only to each other producing a loop, which would trap the user, and ensures the conservation of total page weight in the collection of pages.

The user complies with certain rules in moving from page to page. First, at each step, the user chooses an outbound link randomly and follows it to other pages. Second, if the user comes to the page weight reservoir, the user immediately chooses an outbound link randomly to the other pages. Consequently, each move from page to page is independent from prior history and it only depends on the current page.

Let LW(a→b) denote the link weight, that is, the probability of choosing a particular outbound hyperlink to page b out of all outbound links originating from page a. The probability that the user visits page a at step n after visiting page b through the link b→a is $LW(b \to a) \cdot P_{n-1}(b)$, where $P_{n-1}(b)$ denotes the probability that the user visits page b at step n-1. Thus, we can write the probability of the user visiting page a at step n of the random walk, $P_n(a)$, by collecting the contributions from all other pages as follows:

$$P_n(a) = \sum_b LW(b \to a) \cdot P_{n-1}(b)$$

This equation only applies to actual pages even though the summation variable b includes the page weight reservoir R.

We can write the probability for the user to make a random jump via the page weight reservoir R as follows:

$$P_n(R) = \sum_{a \neq R} LW(a \to R) \cdot P_n(a)$$

Note that the same iteration indices n are used on both sides of the equation, unlike the equation for the actual pages.

If the user continues to move from page to page, eventually the probability of visiting page a will reach an equilibrium value. Page weight of page a is defined as this equilibrium probability:

$$PW(a) = \lim_{n \to \infty} P_n(a)$$

Thus, we have the final equation of page weight:

$$PW(a) = \sum_b LW(b \to a) \cdot PW(b)$$

Note that the sum includes the contribution from the page weight reservoir R.

Since the page weight is the probability for a user to visit a page, it can also represent the importance of each page. A highly popular site, such as the Yahoo! home page is more likely to have higher page weight than less popular and obscure pages.

Link Weight

Link weight is the probability for the user to choose a particular outbound hyperlink out of all outbound links originating from a page. Link weight also represents the importance of the link. In one embodiment, all link weights from a given page a can have a uniform value corresponding to $1/N_{out}(a)$, where $N_{out}(a)$ is the total number of links outbound from page a, including the extra link to the page weight reservoir. Therefore, $N_{out}(a)$ is greater than or equal to one for every page and there is no terminal page in the collection. In another embodiment, not every outbound link is equally important. Thus, we give each link a different weight depending on several factors such as the offset of the link (i.e., position on the page) and the size of the paragraph where the link is located. A link readily visible upon the loading of a page can have a higher link weight than one visible only after scrolling down. The search engine can also assign different weights for external links—links that point to pages in other domain—and internal links—links that point to pages in the same domain. Many times the internal links serve as navigational tools rather than leading to new subjects represented by the anchor texts. The sum of all link weights from a page equals one:

$$\sum_b LW(a \to b) = 1$$

If there is no link from one page to another, the corresponding link weight is zero.

Extrinsic Rank

Extrinsic rank is a measure of the importance of a page for a given keyword as indicated by other pages. It measures the authoritativeness of a page on a given topic or keyword as regarded by public. Once the page weight is obtained the extrinsic rank can be calculated for each keyword and page pair. Extrinsic rank is defined as follows:

$$ER(K; a) = \sum_b AW(K; b \to a) \cdot PW(b)$$

Here, AW(K;b→a) is the anchor weight. It represents the weight given to anchor text found in page b linking to page a for a given keyword K.

The equation multiplies the anchor weight of a link by the weight of the originating page and sums each product for all fetched pages. The anchor weight can be set in many different ways. The anchor text for a given link is useful for setting the anchor weight. We can also consider the related text of the page, which is either nearby the anchor text and/or related to the same topic. Thus, related headings, text in the vicinity of the anchor, and other anchor text on the same page may be useful for setting the anchor weight.

In one embodiment, AW(K;b→a) =LW(b→a) if the keyword is in the anchor text and zero if not. In another embodiment, we assign anchor weight less than or equal to the link weight if the keyword is found in text nearby or related to the anchor text. Thus, related headings, text in the vicinity of the anchor, and other anchor text on the same page can be used to set the anchor weight.

Multi-Keyword Queries

In another embodiment, the ranker 30 calculates the rank of pages for multi-keyword queries in the following manner. For simplicity, let's consider two-keyword query, $K_1, K_2$.

The multi-keyword rank value is as follows:

$$WR(K_1, K_2; a) = IR(K_1, K_2; a) + e \cdot ER(K_1, K_2; a).$$

Where the intrinsic rank for the multi-keyword query is obtained as, $$IR(K_1, K_2; a) = C(K_1, K_2; a) \cdot PW(a).$$

Here $C(K_1, K_2; a)$ is the multi-keyword content score defined as $$C(K_1, K_2; a) = C(K_1 \hat{} K_2; a) \cdot PX(K_1, K_2; a)$$

Where $PX(K_1, K_2; a)$ is the proximity value between two keywords, $K_1$ and $K_2$, in page a. The proximity value has the maximum value of one when $K_2$ immediately follows $K_1$ and decreases to a minimum value as the distance between two keywords grows. The proximity value decreases to its minimum, such as 0.1, when two keywords are separated by more than 10 words, and $K_1 \hat{} K_2$ represents the Boolean AND operation of the two keywords.

For computing the extrinsic rank, $ER(K_1, K_2; a)$, we need to also introduce the concept of partial extrinsic rank as explained in the following section.

The partial extrinsic rank is defined as:

$$PER(UA; a) = \sum_c AW(UA; c \to a) \cdot PW(c)$$

Where page c represents all pages, which contains link to page a with the identical anchor text, UA. In other words, we collect the contributions to extrinsic rank from all pages with identical anchor text into one partial extrinsic rank, which saves computational resources when calculating proximity value. Thus, the partial extrinsic rank is very useful for a multi-keyword query.

In another embodiment, partial extrinsic rank can be used for a single keyword query and will be the sum of partial extrinsic ranks over the identical anchor text:

$$ER(K; a) = \sum_{UA(K)} PER(UA(K); a)$$

Where UA(K) denotes the identical anchor text containing keyword K.

In one embodiment, the ranker 30 uses the partial extrinsic rank to obtain the extrinsic rank for a multi-keyword query in the following manner:

$$ER(K_1, K_2; a) = \sum_{UA(K_1, K_2)} PER(UA(K_1, K_2); a) \cdot PX(K_1, K_2; UA(K_1, K_2))$$

$UA(K_1,K_2)$ is the identical anchor text containing both keywords $K_1$ and $K_2$. $PX(K_1,K_2;UA(K_1,K_2))$ is the proximity value of the keywords $K_1$ and $K_2$ within the identical anchor text $UA(K_1,K_2)$. To facilitate the extrinsic rank calculation of multi-keyword query, the indexed database 28 contains a field to store the partial extrinsic rank for each identical anchor text and stores all offset for each keyword in the anchor text. Therefore, to calculate the extrinsic rank for multi-word query, we can find the entry for $K_1$ and $K_2$ in indexed database 28. For each page there will be a list of identical anchor text with its identification number, the offset of the keyword in the anchor text, and the partial extrinsic rank. From the identical anchor text identification number and offset, the ranker 30 can obtain the proximity value and it collects the product of partial extrinsic rank and proximity value.

In another embodiment, the ranker 30 associates a list of related words for selected broad topic keywords, such as "science" or "sports". In this way we can also solve the problem of synonyms, such as finding the pages for "automobile" when querying with "car."

The related words table can be as follows:

| Word | Related words |
|---|---|
| Automobile | {<auto, 1.0>, <car, 1.0>, <truck, 0.9>, . . .} |
| Sports | {<football, 1.0>, <basketball, 0.9>, <tennis, 0.9>, . . .} |
| . . . | . . . |

The numbers in the table will be used for the anchor weight. Using these tables, when we calculate the extrinsic rank for "automobile", for example, we can collect the keyword "car" at the same time. Further, the anchor text containing "truck" contributes, but with less weight.

Figure 4:
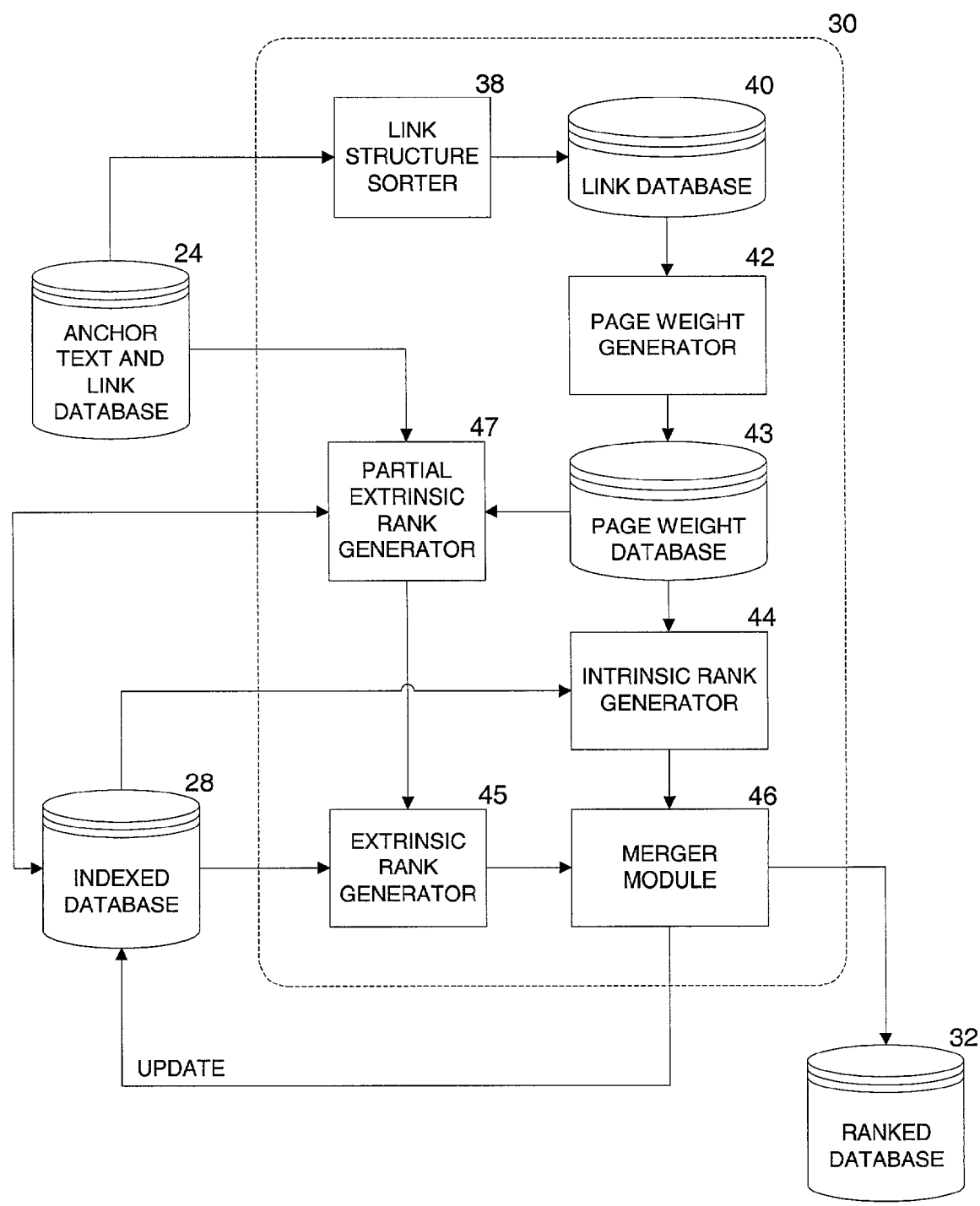
FIG. 4 the architecture of the ranker of the search engine.

As illustrated in FIG. 4, the ranker 30 includes a link structure sorter 38, which extracts records of the link structure from the anchor text and link database 24, and sorts the records in the order of source URL identification number. The sorted records are written in the link database 40. The page weight generator 42 reads the link database 40 and calculates the page weight for the fetched pages and stores them in the page weight database 43. The intrinsic rank generator 44 reads the indexed database 28 to calculate the content score and multiplies it with the page weight read from the page weight database 43 to calculate the intrinsic rank for a given keyword and URL pair. The intrinsic rank generator 44 reads one keyword at a time from the indexed database 28. The indexed database 28 stores a set of records where each record includes the URL identification number and bit fields to indicate the presence and proximity of a given keyword in the title, the anchor text of the inbound link, text related to the anchor text as described earlier, in the plain text, and/or in the URL of the page. Another bit field of the record can be set when the URL is the top-level of a given host.

The partial extrinsic rank generator 47 reads several input files: the anchor text and link database 24, the indexed database 28, and the page weight database 43, and calculates the partial extrinsic rank values for each identical anchor text and URL pair. The resulting partial extrinsic rank is written back to the indexed database 28 to be used for extrinsic rank for single and multi-word query.

The extrinsic rank generator 45 collects the partial extrinsic rank for each keyword and URL pair. In the case of a multi-keyword query, the extrinsic rank generator 45 collects all partial extrinsic ranks for identical anchor text containing the keywords.

Intrinsic and extrinsic rank values are sent to the merger module 46 to be combined into the final rank. The merger module 46 updates the rank of each URL in the indexed database 28. The merger module 46 collects the top-ranked URLs (e.g., top 400 URLs) and writes them in the ranked database 32 in descending order.

Figure 5:
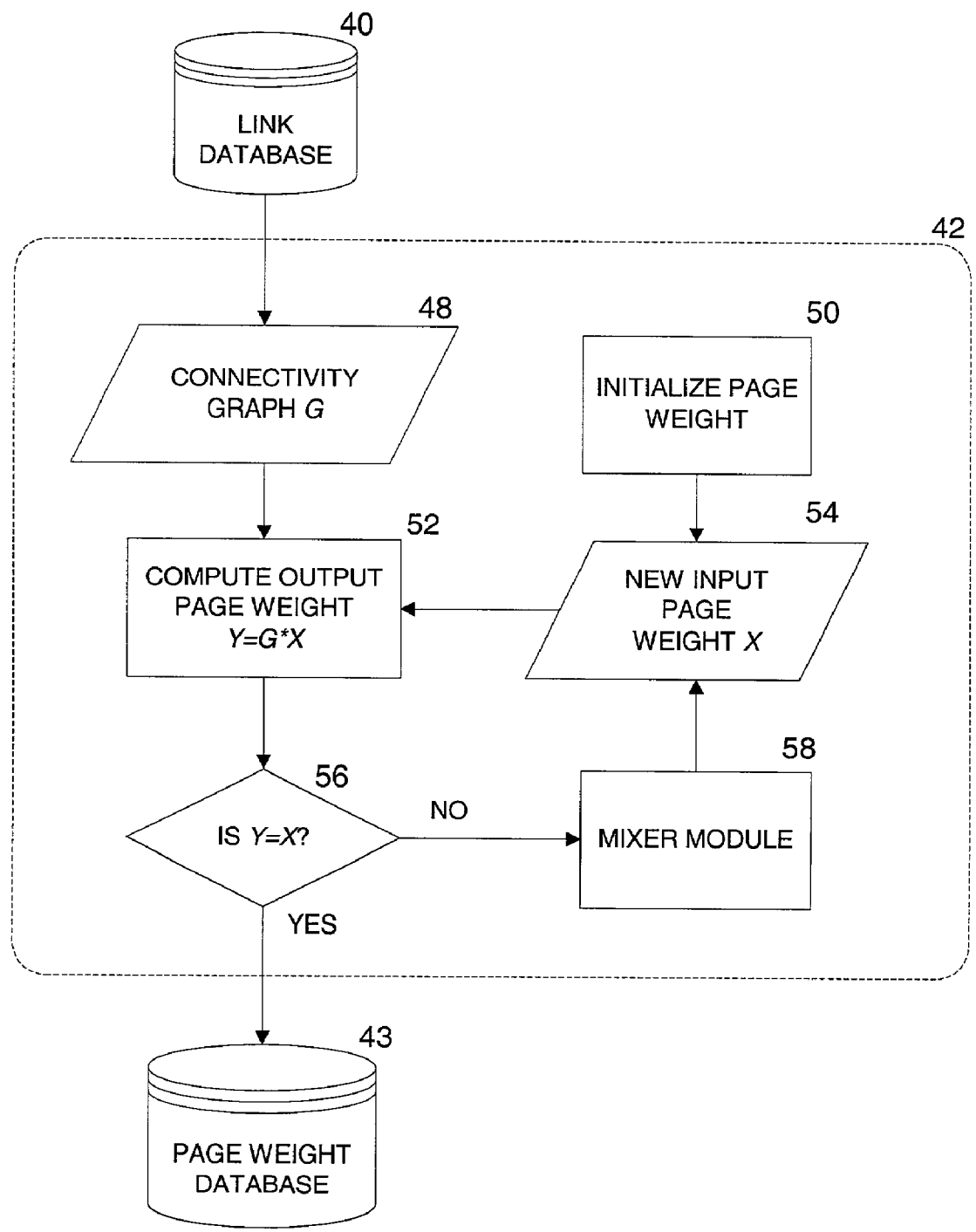
FIG. 5 illustrates the page weight generator of the ranker.

FIG. 5 illustrates the page weight generator 42 of the ranker 30. The function 50 initializes the page weight vector X to a constant such as 1. The connectivity graph G 48, representing the link structure of all of the fetched pages, is constructed from the link database 40. The function 52 takes the connectivity graph G 48 and the new input page weight vector X 54 and computes the output page weight vector Y. The function 56 tests for convergence. If the output page weight vector Y is satisfactorily close to the input page weight vector X within a predetermined tolerance, typically in the order of $10^{-6}$, then the iteration stops and the final page weight vector is written to the page weight database 43. If the convergence is not achieved, the function 56 passes the input and output page weight vectors, X and Y, to the mixer module 58, which mixes them to generate the new input page weight vector X 54, and the iterative process repeats until the convergence is reached. In function 56, we use a normalized error function to measure the convergence as follows:

$$e = \frac{\sum_i (y_i - x_i)^2}{\left(\sum_i x_i\right)^2}$$

Where $x_i$ and $y_i$ represent the components of the input page weight vector X and output page weight vector Y.

As explained below, in one embodiment the extended Anderson Mixing method calculates the page weights iteratively as described in V. Eyert, *A Comparative Study on Methods for Convergence Acceleration of Iterative Vector Sequence*, J. Comp. Phys. 124, 271-285 (1996), which disclosure is incorporated by reference. By analyzing the history of the mixing and the response of the system during a few past iterations, the system teaches itself to construct the next input vector in the most efficient way. The mixing scheme can achieve the same accuracy in about seven iterations for what appears to take others more than 200 iterations.

The page weight for the fetched pages can be found by solving the following matrix equation:

$$X = G \cdot X$$

X is a N×1 column matrix representing the page weights for all N fetched pages. N×N square matrix G represents the connectivity graph. The off-diagonal elements of G represent the link connectivity between the pages. The diagonal elements of the matrix G are all equal to zero. The solution vector X is an eigenvector of the matrix G with the eigenvalue one. In principle, the solution vector X can be obtained from solving this matrix equation exactly. In dealing with the World Wide Web, however, the number of total pages N is very large—order of hundred of millions or billions—and solving this matrix equation exactly is impractical in terms of computer memory and CPU time. Thus, we employ the iterative method. We start with a guess for X in the right-hand-side to obtain X in the left-hand-side. In general, the input and output X will not be same and we combine the input and output X to prepare new input X and iterate this process until they become self-consistent within the preset tolerance.

Figure 6:
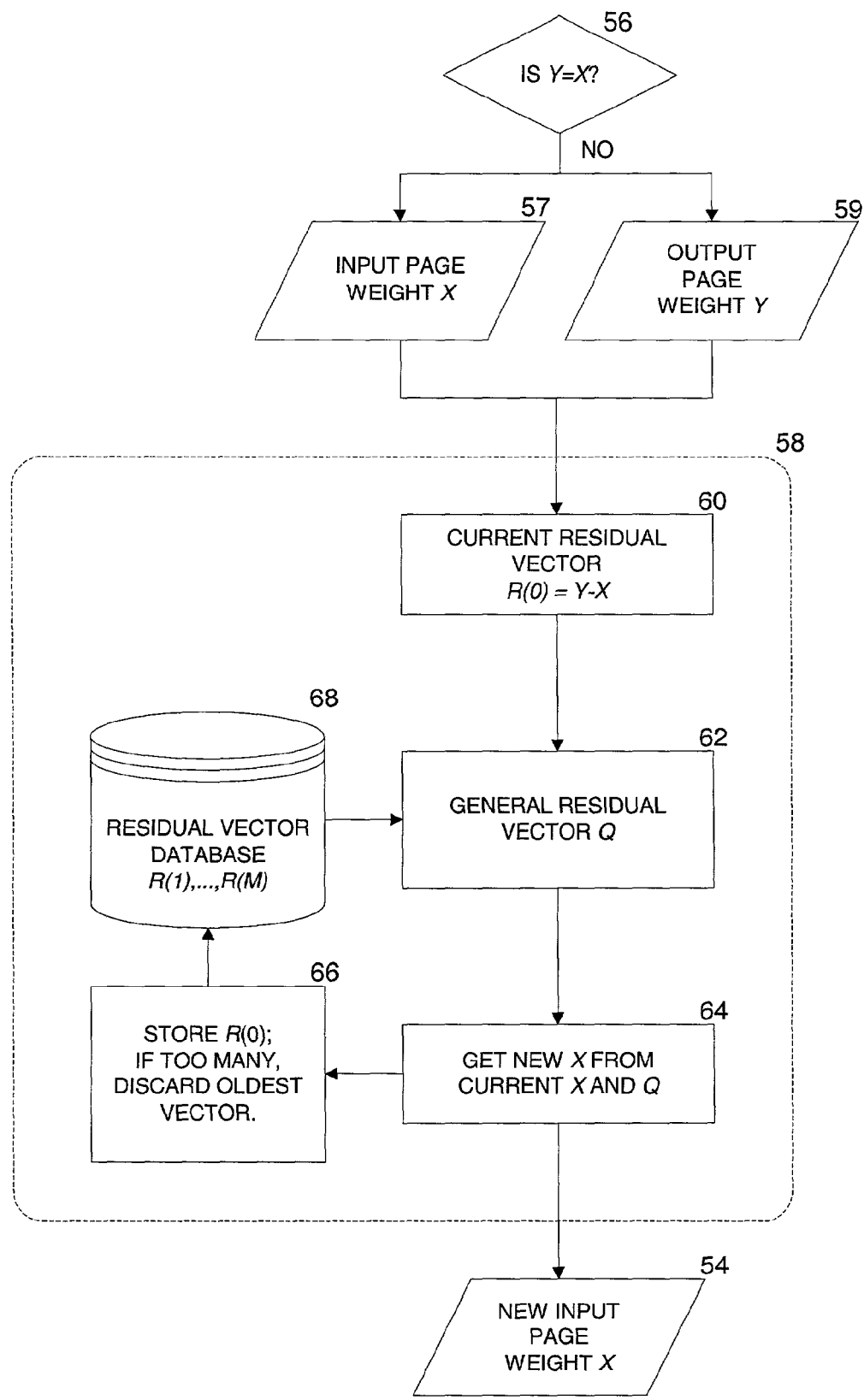
FIG. 6 illustrates the architecture of the mixer of the page weight generator.

FIG. 6 illustrates one embodiment of a mixer module 58. The function 56 passes the input page weight vector X 57 and output page weight vector Y 59 to the mixer module 58 when convergence is not achieved. A function 60 calculates the residual vector R=Y−X. When the residual vector R has negligible magnitude, such as $10^{-6}$ it signifies satisfactory convergence and the iteration can stop. The mixer module 58 includes a function 62 which calculates the general residual vector, Q, which is the linear combination of the residual vectors of current and previous iterations:

$$Q = R + \sum_{j=1}^{M} b_j (R^j - R)$$

Here, R is the residual vector of current iteration and $R^J$ is the residual vector of j-th previous iteration. M is the history level and is typically 3 or 4. The coefficients $b_J$ are determined by the requirement that they yield that particular linear combination, which minimizes the magnitude of the general residual vector, <Q|Q>. Minimizing with respect to the coefficients $b_j$ we obtain the linear equation system, which can be solved using conventional matrix algebra. Once Q is obtained, the function 64 calculates the new input page weight vector can be obtained using:

$$X^{new} = X + \beta Q$$

Here β is a constant parameter and the value of 0.5 works usually well.

In function 66, the mixer module 58 saves the current residual vector R 60 to the residual vector database 68 to be used for next iteration. If there are already M residual vectors in the database 68, we discard the oldest residual vector.

In another embodiment, the present invention provides a method for assigning the ranking scores for multi-keyword query. When user enters more than one keyword for query, we combine the ranking scores for each keyword to obtain the final ranking scores. We give slightly more weight to the first word and the weight gets smaller for following words until it levels off at about 4th word. In one embodiment, the weight for i-th keyword, $w_i$, is obtained as follows:

$$w_i = f_i \bigg/ \sum_{j=1}^{n} f_j$$

$$f_i = f_0 + (1 - f_0) e^{-i/\sigma}$$

Here n represents the number of keywords in the query. The constant parameters $f_0$ and σ has typical values of 0.5 and 1, respectively.

In another embodiment, the present invention provides a method for calculating ranking scores by dividing the entire hypertext pages into distinct number of groups. The page weight can be refined further by classifying pages into several distinct groups such as "Art", "Education", "Reference", etc. Once the pages are classified, the page weights can be calculated in the same manner described above within these groups. The page weight will be more relevant for the given topic.

What is claimed:

1. A computer-implemented method of ranking the relevancy of pages in a collection of pages including linking hypertext pages, comprising:

crawling the World Wide Web to produce a collection of pages without limitation to topic;

for each page in the collection of pages, examining a probability of visitors viewing a particular page to determine a page weight for said particular page;

for each of a plurality of selected words, with regard to each of a plurality of selected pages in the collection of pages, determining an intrinsic ranking factor for use of a selected word on a selected page in the collection of pages by examining content related to the selected word on the selected page to determine a content score and adjusting the content score in accordance with the page weight of the selected page, and determining an extrinsic ranking factor for use of the selected word on the selected page by, for each linking page in the collection of pages containing an outbound hypertext link to the selected page, examining text associated with the outbound hypertext link on the linking page related to the selected word to determine an anchor weight for the linking page, adjusting the anchor weight in accordance with the page weight of the linking page and combining the adjusted anchor weights for all linking pages containing an outbound hypertext link to the selected page;

ranking the selected page for the selected word by combining the intrinsic and extrinsic ranking factors related thereto; and then creating a database of the collection of pages indexed by the plurality of selected words, each indexed selected word in the database index associated with pages ranked for said each indexed selected word so that ranked search results are produced in response to a subsequent query which includes one or more of the selected words.

2. The invention of claim 1, further comprising:

indexing the collection of pages to select the plurality of selected words from the pages in the collection of pages.

3. The invention of claim 1, further comprising:

re-crawling the World Wide Web without limitation to topic to update the collection of pages.

4. The invention of claim 1, where determining an extrinsic ranking factor further comprises:

adjusting the extrinsic ranking factor, for each linking page, for a link weighting factor weight related to a quantity of outbound links on that linking page to other pages in the collection of pages.

5. The invention of claims 2, 3 or 4 wherein determining the extrinsic ranking factor further comprises:

determining a size of a paragraph in which the selected word is used in the linking page.

6. A computer implemented method of ranking the relevancy of pages in a collection of pages including linking hypertext pages, comprising:

(a) crawling and re-crawling the World Wide Web without limitation to topic to produce and maintain a collection of pages representing the World Wide Web;

(b) for each page of the collection of pages including linking hypertext pages, without a priori knowledge of keywords to be used in any particular query, determining a page weight related to a probability of a user viewing said each page as a result of viewing the pages in a random fashion in the collection, a plurality of selected words from said each page unrelated to topic;

a content score for use of each one of the plurality of selected words on said each page, and an anchor weight, related to the use of said each of the plurality of selected words in association with an outbound link on said each page to another page in the collection;

(c) for each pair of one of the plurality of selected words and a select page having a content score for said one of the plurality of selected words, ranking a relevancy of said selected page for said one of the plurality of selected words, in accordance with a combination of the content score for the selected word on the selected page adjusted in accordance with the page weighting factor for the selected page, and the anchor weight for each linking page having an outbound link to the selected page adjusted in accordance with a page weight for said each linking page; and (d) for each one of the plurality of selected words, collecting the pages ranked for said each one of the plurality of selected words to build a searchable databases, indexed in accordance with the plurality of selected words, so that a ranked set of search results pages is produced by searching the database in response to the particular query for the ranked selected words corresponding to the keywords in the query.

7. The method of claim 6 wherein ranking a relevancy further comprises:

further adjusting the said anchor weights for each linking page in accordance the number of outbound links on that linking page.

8. The method of claim 6 further comprising:

adjusting the ranking in accordance with a proximity between at least two of the plurality of selected words.

9. The method of claim 6 further comprising:

adjusting the ranking in accordance with a word order between the at least two of the plurality of selected words.

10. A computer-implemented method of ranking the relevancy of pages in a collection of pages including linking hypertext pages, comprising:

crawling the Web to produce a collection of pages without limitation to topic;

selecting words from the pages of the collection of pages without a priori knowledge of keywords in a query;

ranking the pages in the collection of pages for the selected words by, for each of the selected words with regard to each of the selected pages;

determining an intrinsic ranking factor for by examining content related to the selected word on the selected page to determine a content score and adjusting the content score in accordance with the page weight of the selected page;

determining an extrinsic ranking factor for use of the selected word on the selected page by, for each linking page in the collection of pages containing an outbound hypertext link to the selected page, examining text associated with the outbound hypertext link related to the selected word to determine an anchor weight for the linking page, adjusting the anchor weight in accordance with the page weight of the linking page and combining the adjusted anchor weights for all linking pages containing an outbound hypertext link to the selected page; and ranking each selected page for each selected word by combining the intrinsic and extrinsic ranking factors related thereto; and creating a searchable data structure related to the pages in the collection of pages indexed in accordance with the selected words, each indexed word associated with pages ranked for each such indexed word so that search results provided in response to the query are already ranked in accordance with relevance to the query.

11. The method of claim 10 wherein ranking each selected word for each selected page by containing the intrinsic and extrinsic ranking factors related thereto further comprises:

adjusting the anchor weight for each such linking page in accordance with a link weight based on other outbound links on such linking page.

12. A computer-implemented method of ranking the relevancy of pages in a collection of pages including linking hypertext pages, comprising:

(a) determining an a set of words used on a selected page to be ranked in a collection of pages;

(b) determining an intrinsic ranking factor for the selected page for each word in the set of words by determining a content score for use of the selected word on the selected page and adjusting the ranking for a page weight associated with the page being ranked;

(c) determining an extrinsic ranking factor for remaining pages in the collection of pages for use of said each word in association with an outbound link to the selected page by determining an anchor weight for the page being ranked and adjusting the ranking for a page weight associated with the page being ranked;

(d) repeating (a) through (c) for all pages in the collection of pages; and (e) forming an index entry for each word in all the sets of words, each index entry including a list of the pages in the collection of pages using the word being indexed having the highest combined rankings for 1) the intrinsic ranking factor for use of the word being indexed on the page being listed and 2) the extrinsic ranking factor for use of the word being indexed in association with pages having an outbound link to the page being listed.

13. The method of claim 12 wherein (c) further comprises:

further adjusting the extrinsic ranking factor for a link weight associated with other outbound links on the page being ranked.

* * * * *